(12) United States Patent
Thavisri

(10) Patent No.: US 8,401,007 B2
(45) Date of Patent: Mar. 19, 2013

(54) NETWORK SYNCHRONIZATION OVER IP NETWORKS

(75) Inventor: Vipapun Thavisri, Holmdel, NJ (US)

(73) Assignee: Avaya Inc., Basking Ridge, NJ (US)

( * ) Notice: Subject to any disclaimer, the term of this patent is extended or adjusted under 35 U.S.C. 154(b) by 71 days.

(21) Appl. No.: 12/419,144

(22) Filed: Apr. 6, 2009

(65) Prior Publication Data

US 2010/0254499 A1 Oct. 7, 2010

(51) Int. Cl.
  *H04L 12/66* (2006.01)
  *H04L 3/06* (2006.01)
  *G06F 15/173* (2006.01)

(52) U.S. Cl. ........ 370/356; 370/256; 370/390; 370/503; 370/516; 709/203; 709/223

(58) Field of Classification Search .......... 370/226–503, 370/516
See application file for complete search history.

(56) References Cited

U.S. PATENT DOCUMENTS

| | | | |
|---|---|---|---|
| 5,666,366 A * | 9/1997 | Malek et al. .................. 370/505 |
| 5,673,252 A | 9/1997 | Johnson et al. |
| 6,363,053 B1 * | 3/2002 | Schuster et al. ............. 370/230 |
| 6,512,761 B1 * | 1/2003 | Schuster et al. ............. 370/352 |
| 6,549,587 B1 * | 4/2003 | Li .............................. 375/326 |
| 6,731,654 B1 * | 5/2004 | Champion et al. ............ 370/503 |
| 6,765,931 B1 * | 7/2004 | Rabenko et al. ............. 370/493 |
| 6,795,421 B1 * | 9/2004 | Heinonen et al. ............ 370/338 |
| 6,810,417 B2 * | 10/2004 | Lee ............................. 709/220 |
| 6,850,577 B2 * | 2/2005 | Li .............................. 375/326 |
| 6,880,090 B1 * | 4/2005 | Shawcross .................... 726/14 |
| 6,975,654 B1 | 12/2005 | Domon |
| 6,996,128 B2 * | 2/2006 | Rabenko et al. ............. 370/468 |
| 7,126,937 B2 * | 10/2006 | Crosbie et al. ............... 370/350 |
| 7,177,306 B2 * | 2/2007 | Dowdal et al. ............... 370/356 |
| 7,330,900 B2 * | 2/2008 | Burger et al. ................ 709/231 |
| 7,359,406 B2 * | 4/2008 | Holloway et al. ............ 370/503 |

(Continued)

FOREIGN PATENT DOCUMENTS

DE 102009043278 A1 * 10/2010
EP 0450828 10/1991

(Continued)

OTHER PUBLICATIONS

Examination Opinion and Search Report for UK Patent Application No. GB0917008.5, mailed Dec. 9, 2009.

(Continued)

*Primary Examiner* — Ayaz Sheikh
*Assistant Examiner* — Venkatesh Haliyur
(74) *Attorney, Agent, or Firm* — Sheridan Ross P.C.

(57) ABSTRACT

Network timing is derived from the PSTN and distributed through the network to gateways capable of deriving timing from the incoming UDP stream. The derived timing has the correct frequency for voice telephony without using external timing sources or extraneous hardware components. For example, a digital signal processor (DSP) can derive the timing from a timed TDM bus and distribute messages, such as IP messages, to other gateways or port networks. The other gateways and port networks use the incoming stream to extract the timing which is then used to time their TDM bus. The port networks and gateways can also distribute other streams to other gateways in a fan-out type of arrangement. This internally generated timing can be used, for example, for Circuit Emulated Services (CES).

14 Claims, 13 Drawing Sheets

U.S. PATENT DOCUMENTS

| | | | |
|---|---|---|---|
| 7,529,325 B2 * | 5/2009 | Li | 375/344 |
| 7,551,647 B2 * | 6/2009 | Fellman et al. | 370/503 |
| 7,583,897 B2 * | 9/2009 | Farmer et al. | 398/72 |
| 7,701,954 B2 * | 4/2010 | Rabenko et al. | 370/401 |
| 7,730,202 B1 * | 6/2010 | Biederman et al. | 709/235 |
| 7,773,639 B2 * | 8/2010 | Lide | 370/519 |
| 7,809,027 B2 * | 10/2010 | Fourcand | 370/509 |
| 7,936,991 B2 * | 5/2011 | Sugawara et al. | 398/67 |
| 7,986,729 B2 * | 7/2011 | Kennedy et al. | 375/239 |
| 8,238,377 B2 * | 8/2012 | Morrow et al. | 370/503 |
| 2002/0165981 A1 | 11/2002 | Basturk et al. | |
| 2003/0138061 A1 * | 7/2003 | Li | 375/326 |
| 2004/0062260 A1 * | 4/2004 | Raetz et al. | 370/412 |
| 2004/0076187 A1 | 4/2004 | Peled | |
| 2004/0081079 A1 | 4/2004 | Forest et al. | |
| 2005/0018798 A1 * | 1/2005 | Li | 375/355 |
| 2005/0031097 A1 * | 2/2005 | Rabenko et al. | 379/93.31 |
| 2005/0094628 A1 * | 5/2005 | Ngamwongwattana et al. | 370/352 |
| 2006/0080459 A1 * | 4/2006 | Nanri | 709/237 |
| 2007/0008108 A1 * | 1/2007 | Schurig et al. | 340/539.11 |
| 2007/0008884 A1 * | 1/2007 | Tang | 370/230 |
| 2007/0064715 A1 * | 3/2007 | Lloyd et al. | 370/401 |
| 2007/0223464 A1 * | 9/2007 | Weir et al. | 370/356 |
| 2008/0075120 A1 * | 3/2008 | Fourcand | 370/503 |
| 2008/0075121 A1 * | 3/2008 | Fourcand | 370/503 |
| 2008/0075122 A1 * | 3/2008 | Fourcand | 370/503 |
| 2008/0075128 A1 * | 3/2008 | Fourcand | 370/520 |
| 2008/0080561 A1 * | 4/2008 | Lide | 370/503 |
| 2008/0170594 A1 * | 7/2008 | Qu | 370/512 |
| 2008/0240165 A1 | 10/2008 | Balassanian et al. | |
| 2008/0281938 A1 | 11/2008 | Rai et al. | |
| 2008/0304472 A1 * | 12/2008 | Gourlay et al. | 370/352 |
| 2009/0059960 A1 * | 3/2009 | Li | 370/498 |
| 2009/0080888 A1 * | 3/2009 | Sugawara et al. | 398/61 |
| 2009/0276542 A1 | 11/2009 | Aweya et al. | |
| 2010/0074278 A1 | 3/2010 | Dobjelevski et al. | |
| 2010/0254411 A1 * | 10/2010 | Morrow et al. | 370/503 |
| 2010/0254499 A1 * | 10/2010 | Thavisri | 375/356 |
| 2010/0316069 A1 * | 12/2010 | Fourcand | 370/503 |

FOREIGN PATENT DOCUMENTS

| | | |
|---|---|---|
| GB | 2392588 | 3/2004 |
| JP | 2010246084 A * | 10/2010 |
| WO | WO 98/04063 | 1/1998 |

OTHER PUBLICATIONS

U.S. Appl. No. 12/419,110, filed Apr. 6, 2009, Morrow.
Search Report for UK Patent Application No. GB0917022.6, mailed Dec. 9, 2009.
Official Action for U.S. Appl. No. 12/419,110, mailed Oct. 5, 2010.
Official Action for U.S. Appl. No. 12/419,110, mailed Feb. 18, 2011.
Official Action for U.S. Appl. No. 12/419,110, mailed Aug. 4, 2011.
Notice of Allowance for U.S. Appl. No. 12/419,110, mailed Apr. 12, 2012.

* cited by examiner

M = Master
TCS = Tandem Clock Source
S = Slave
Member = at least one of a Port Network and a Media Gateway

NETWORK SYNCHRONIZATION OVER IP NETWORKS

FIELD OF THE INVENTION

An exemplary embodiment of this invention relates to communications devices, protocols, techniques and timing. More specifically, an exemplary aspect of this invention relates to synchronizing various members of an IP network and management thereof.

BACKGROUND

Traditional port networks (PNs) are timed through fiber connections from a Center Stage Switch (CSS). Port Networks (PN) and Media Gateways (MG) that are connected via IP are timed through a local reference board. Media Gateways cannot interface to a CSS.

Use of a Network Timing Protocol (NTP) and Simple Network Timing Protocol (SNTP) require setting up a connection to a SNTP or NTP server which may not always be possible in certain environments, such as a private LAN.

GPS receivers are another method for maintaining synchronization, however GPS requires specialized receivers which must interface with the gateway. Therefore, this solution does require some hardware and software development.

IEEE 588 provides a high resolution based on dedicated hardware to provide a highly precise real-time clock in a time-stamp unit. A software module is used in conjunction with the dedicated hardware to handle the protocols and timing.

SUMMARY

In accordance with one exemplary aspect of the present invention, timing is derived from the PSTN and distributed through the network to gateways capable of deriving timing from the incoming UDP stream. The derived timing has the correct frequency for voice telephony without using external timing sources or extraneous hardware components.

For example, a digital signal processor (DSP) can derive the timing from a timed TDM bus and distribute messages, such as IP messages, to other gateways or port networks. The other gateways and port networks use the incoming stream to extract the timing which is then used to time their TDM bus. The port networks and gateways can also distribute other streams to other gateways in a fan-out type of arrangement. This internally generated timing can be used, for example, for Circuit Emulated Services (CES).

Clock Synchronization Over Internet Protocol (CSOIP) is one way to provide system clocking using IP streams. An Inter-Gateway Connection (IGC) can be created to convey these streams from one member to another member. For ease of discussion and applicability to the various types of hardware in an IP-connected network, the various gateways, port networks, and the like will be referred to as "members." Examples of components that fall into this descriptive category are the G650 and G450 which are considered "gateways" with G650 housing a board known as the Crossfire™ which is populated with DSPs for VoIP processing and the G450 with the similar board, the MP80, which serves a similar purpose.

While it may be desirable to utilize a DS1, BRI or other board to provide a system reference which is delivered from the PSTN, it is not necessary since a local clock on any member can also be used. However, any number of DS1, BRI, or other reference boards can be used as reference sources since all PSTN derived timing is ultimately traceable to a higher level stratum clock. In accordance with an exemplary embodiment of this invention, it can be left up to the user to choose the primary source(s).

Before the use of IP telephony, port networks used a reference board such as a DS1 which was installed in one of the port networks to extract a timing signal from the span connected to the PSTN. This timing signal can be used to time the TDM bus on the port network. Because all port networks can be connected to a center stage switch, timing was distributed to all the other port networks by the interface boards to the CSS. Therefore, all TDM busses in all of the port networks were synchronized.

With the advent of IP telephony, port networks and media gateways can stand alone without connection to a CSS. Port Networks generally can be connected to a CSS anyway, and TDM bus timing comes from the local clock or from a reference board installed in the port network or media gateway. However, the only way to achieve a system-wide synchronization is to have reference boards in all port networks or media gateways, which is an expensive proposition.

In accordance with an exemplary embodiment of the present invention, clock synchronization over IP is based on the idea of "synchronization domains." A domain is defined by one member with a clock-sync reference emanating timing streams to other members, referred to as sync domain members (slaves). The clock/sync reference can be a DSI/BRI trunk or a received IGC stream. A member must be capable of receiving a clocking IGC stream and sending multiple IGC streams. Since a member is using VoIP resources for this purpose, the number of such streams must be limited to avoid unduly impacting the call carrying capabilities of the DSP boards. This limitation or value will be referred to as the "fan-out" of the member. A single clock source will not be able to source streams to the maximum number of members in a system, therefore some clock receivers will also become clocking sources, known as tandem clock sources. Tandem clock sources in turn, also source streams (IGC streams) to other members.

A master domain has a member with a clock/sync reference derived from a DS1 or BRI. This reference is then used by the DSP to provide IGC streams to other members, known as slave members. A slave member is one hop level below the clock source. A tandem domain has a member with a clock/sync reference derived from an incoming IGC stream which is then used to clock outgoing IGC streams to other members (slaves).

When a slave member receives clocking through several tandem clocks, each tandem clock designates a "level" or "hop." The hop count is the number of tandem clocks between the slave member and its master clock member. The maximum number of hops can be dependent on the convergence time requirements for a slave clock at the end of the chain.

In accordance with one exemplary embodiment, sync distribution is performed in accordance with the following steps. When the first member (IGC source) comes into service, the first member becomes a default system clock source. All other members (IGC sources) then become slaves, forming a default master domain, until the fan-out limit is reached. This fan-out limit can be based on one or more of DSP resources, capabilities of a member, and instructions from a communications manager. As additional members come in to service, a slave is "promoted" to a tandem clock source. Subsequent members (IGC sources) are then clocked from this tandem source, forming a tandem domain, until the fan-out is reached. Then, another slave from a sync domain at the lowest hop level is promoted to a tandem clock source. When all clock slaves in a hop level have been promoted, slaves in the next lower hop level are promoted.

If a member with a DS1/BRI reference comes into service, it will be used to create a master clock domain. If there is a default system clock, it is demoted from that role. The default system clock could become a member with a tandem clock/sync reference or a slave member, depending upon the reassignment. All of the preexisting domain members can also be reassigned. There can be as many master clock domains as there are administered clock/sync references.

As members with clock/sync references come in and out of service, domains will need to be deleted created, or modified. When a member with a tandem clock/sync reference goes out of service, all other members of the domain which get their timing from that member are assigned to other domains. This principle can extend to the master domains (domain having a member with a DS1/BRI clock-sync reference) as well.

For ease of discussion, herein a clock/sync reference will be referred to a DS1/BRI trunk, or received IGC stream. A member refers to a port network or media gateway. A clock source is a member with a clock/sync reference. A master source is a member with a DS1/BRI clock/sync reference. A tandem source is a member with an IGC derived clock/sync reference. The domain is a member with a clock/sync reference emanating IGC streams to other members. A master domain is a domain with a member having a DS1/BRI clock/sync reference emanating IGC streams to other members. A tandem domain is a domain with members having an IGC derived clock/sync reference emanating IGC streams to other members. A slave is a domain member having an IGC derived clock/sync reference.

Accordingly, aspects of this invention relate to network timing.

More specifically, aspects of this invention relate to clock synchronization over Internet protocols.

Still further aspects of the invention relate to generating internal timing for circuit emulated services.

Still further aspects of the invention relate to deriving timing from a PSTN and distributing the timing through a network members capable of deriving timing from an incoming UDP stream. The derived timing has the correct frequency for voice telephony without using external timing sources or extraneous hardware components.

Still further aspects of the invention relate to management of domains within an IP connected network.

Still further aspects of the invention relate to one or more of promotion and demotion of members within an IP connected network for timing synchronization.

Still further aspects of the invention relate to maintaining timing in an IP connected network through the use of intergateway connections, masters, tandem clock sources and slaves.

Still further aspects of the invention relate to domain management based on member's availability.

The present invention can provide a number of advantages depending on the particular configuration. These and other advantages will be apparent from the disclosure of the invention(s) contained herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like.

While circuit or packet-switched types of communications can be used with the present invention, the concepts and techniques disclosed herein are applicable to other protocols.

Accordingly, the invention is considered to include a tangible storage medium or distribution medium and prior art-recognized equivalents and successor media, such as a computer-readable media, in which the software implementations of the present invention are stored.

The terms "determine," "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented

DETAILED DESCRIPTION

The invention will be described below in relation to an IP connected network environment. Although well suited for use in IP connected networks, the invention is not limited to use with any particular type of communication system or configuration of system elements and those skilled in the art will recognize that the disclosed techniques may be used in any application in which it is desirable to provide timing synchronization.

The exemplary systems and methods of this invention will be described in relation to software, modules, and associated hardware and network(s). However, to avoid unnecessarily obscuring the present invention, the following description admits well-known structures, components and devices that may be shown in block diagram form, are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Figure 1:
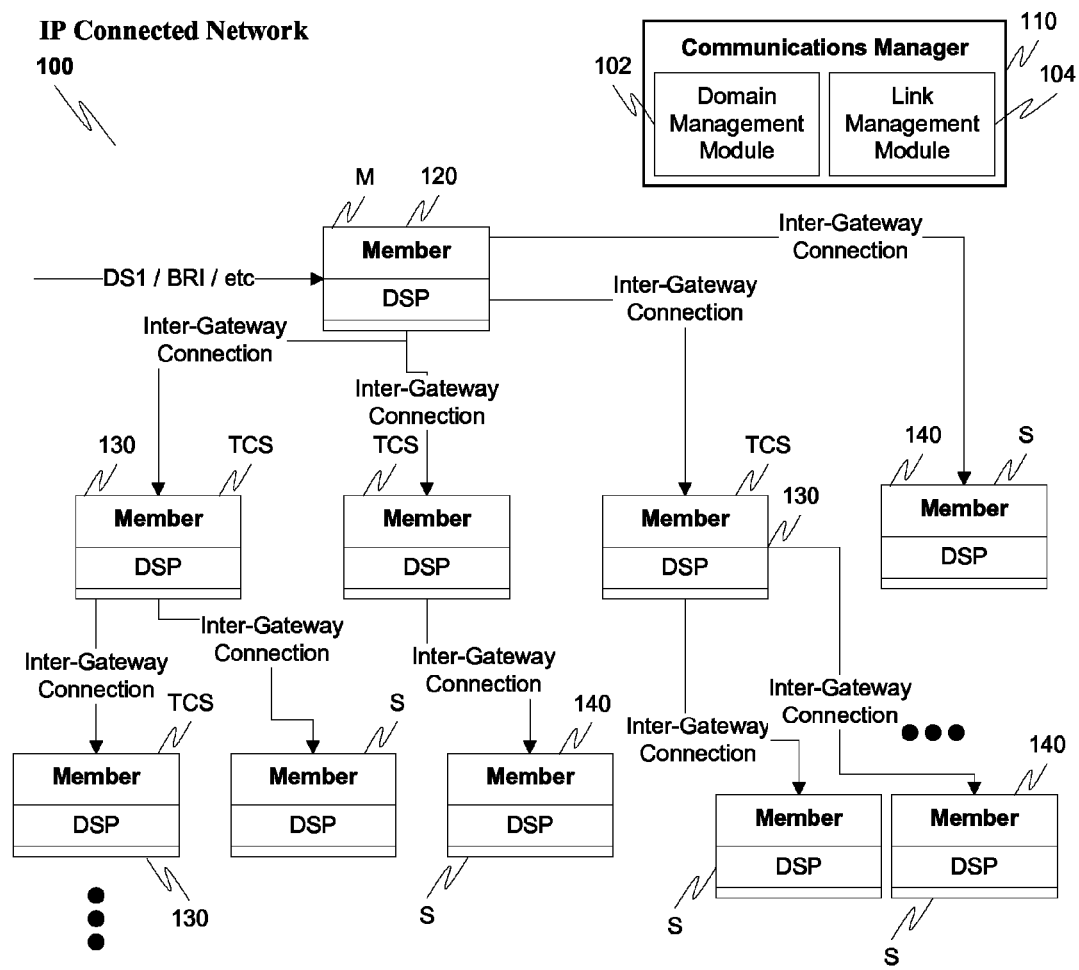
FIG. 1 illustrates an exemplary IP connected network according to this invention.

FIG. 1 illustrates an exemplary IP connected network 100 according to this invention. The IP connected network 100 includes a communications manager 110, as well as various members. In general, each member may include a DSP and is designated as a master source, such as member 120, as a tandem source, such as members 130, or a slave, such as members 140. In accordance with this particular exemplary embodiment, member 120 receives a DS1/BRI clock/sync reference which is then distributed through an inter-gateway fan-out connection to a plurality of members, herein four members. These members may then in turn forward timing information via inter-gateway connections (IGC's) to subordinate members down the chain.

The hierarchy of the IP connected network is managed by the communications manager 110 and links between the various members established and reassigned by the communications manager 110.

More specifically, the communications manager 110 includes a domain management module 102 and a link management module 104. As described hereinafter in greater detail, the domain management module 102 assists the communication manager 110 with establishing domains, assigning members to domains, and monitoring a member status within a domain. The link management module 104 assists the communication manager 110 with establishing the various communication links that interconnect the various members in the IP connected network 100.

Information that can be taken into consideration by one or more of the communications manager 110, the domain management module 102 and the link management module 104 are capabilities of each of the members, and more specifically capabilities of a DSP device associated with a member, latency between one or more members, hierarchy of the IP connected network 100, hop level information, fan-out information, reference clock information, operational status of one or more members in the IP connected network 100, QoS information, and in general any information to assist with clock synchronization within the network architecture.

Figure 2:
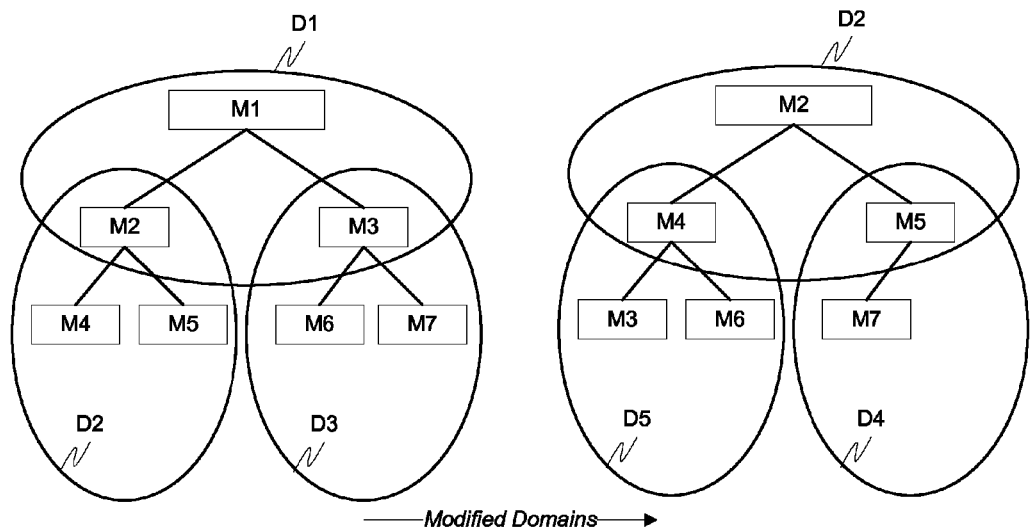
FIG. 2 illustrates techniques for exemplary domain management according to this invention.
Figure 3:
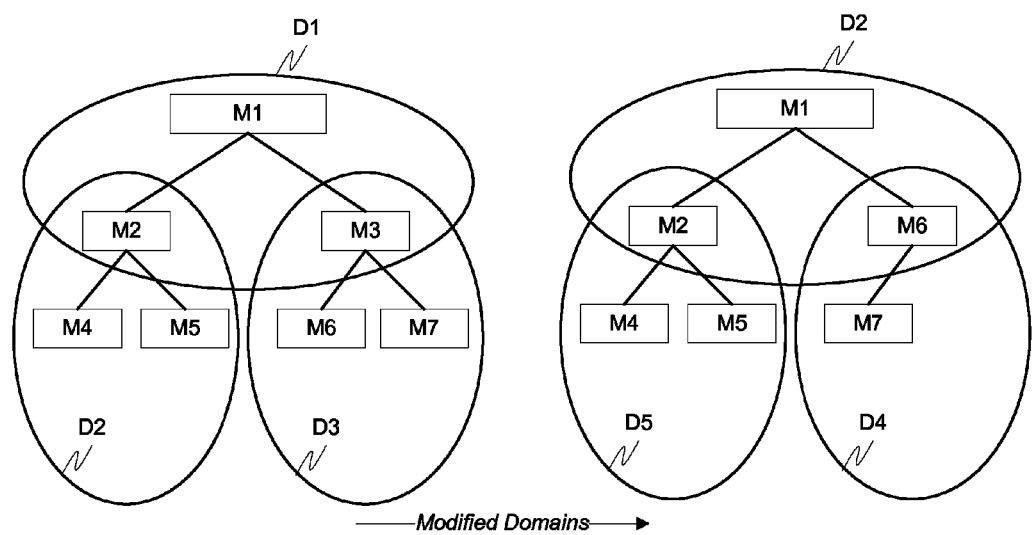
FIG. 3 illustrates another example of domain management according to this invention.

FIGS. 2 and 3 illustrate domain creation, modification and deletion. As discussed, domain management will be handled in conjunction with the domain management module 102 and the link management module 104. More specifically, in FIG. 2, the left hand portion of the figure shows the initial domain configuration and the right hand portion of FIG. 2 an adjusted or modified domain configuration upon the exemplary scenario of a loss of the master domain source M1.

Specifically, for the left hand portion of the figure, domain 1 (D1) includes three members, M1, M2 and M3. Domain 2 (D2) includes members M2, M4 and M5. Domain 3 (D3) includes members M3, M6 and M7. Member 1 (M1) is the master for all the domains since it supplies clocking to all members. Members M2 and M3 are tandem clock sources which receive their timing from M1 and distribute timing to the other members, referred to as slave members.

If M1 were to become an operative, then one of the tandems, in this illustrative example M2, is "promoted" to a master. The members of domain 3 (D3) are then reassigned to members M4 and M5 and new domains created. Thus, the right-hand portion of FIG. 2 shows the modified domains with D5 including members M4, M3 and M6, and D4 including members M5 and M7.

FIG. 3 illustrates in greater detail how domains can be managed when a tandem clock source becomes inoperative. In this example, the initial domain is on the left and the modified domain on the right. Here, tandem clock source M3 became inoperative and the slave members were reassigned by "promoting" a slave member to a tandem clock source and assigning a member to it, thereby creating a new domain. Thus, the modified domain includes domains D2, D5 and D4, with D5 including members M2, M4 and M5, and D4 including members M6 and M7, with M6 being a tandem clock source. As discussed, domain management module 102 and link management module 104 manage, and track this domain reconfiguration and store information related thereto in the communications manager 110.

In addition to other factors, the communications manager 110, domain management module 102 and link management module 104 can take into consideration the bandwidth of the link(s) between the members when modifying or reorganizing domains.

Additional aspects of the invention address compatibility with traditional port network synchronization. For example, for members to get their timing via synchronized links such as the expansion interface (IE) board NACSS, all that is needed is to provide the port network (PN) group with a reference such as a standard reference board or an IGC, thereby allowing the techniques of this invention to be extended to this environment. This has at least two exemplary advantages, only one board, such as the Crossfire™ board, needs to get a reference stream and all boards, such as Crossfires™ in the port network group, can now serve as tandem clock sources.

Furthermore, because the timing IGCs are constantly operational and the various DSP boards are measuring and reporting the quality of the incoming IP stream, the IP network is constantly being monitored. This information could prove to be invaluable for network administrators when evaluating the overall health and robustness of their network.

Furthermore, the actual number content of the timing packets is irrelevant since it is the arrival time of the packet which is the parameter of interest. There is no particular reason why the stream could not also carry call information. This has the advantage of not detracting from the call capacity of the DSP board and, in small installations or in LANs where bandwidth is not an issue, allowing maximum fan-out—this decreases hop level and allows faster convergence.

Figure 4:
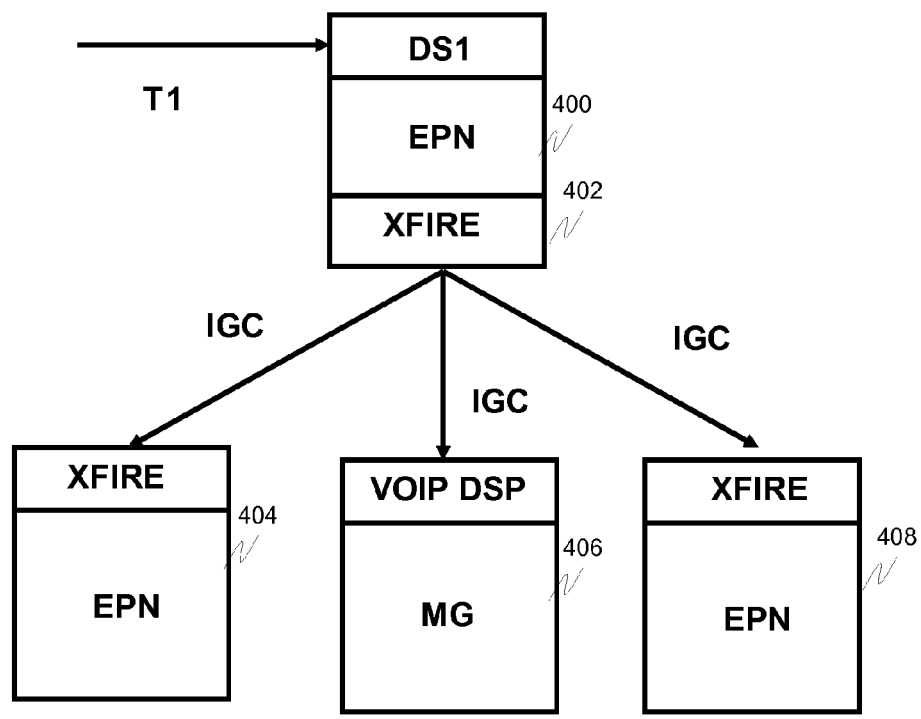
FIG. 4 illustrates sync distribution to an IP expansion peripheral node according to this invention.

FIG. 4 illustrates an exemplary embodiment of sync distribution for an IP expansion peripheral node (EPN). More specifically, the EPN receives a clock/sync reference and is therefore the master source 400. A media gateway resource board, such as the Crossfire™ 402 (XFire) includes, as discussed, DSPs and therefore determines a clock synchronization signal that is forwarded via the IGCs to other members, such as another EPN 404, a media gateway 406 and yet another EPN 408.

Each of these members (404, 406 and 408) are slaves since they receive timing information from another source and rely on an IGC derived clock/sync reference for timing.

Figure 5:
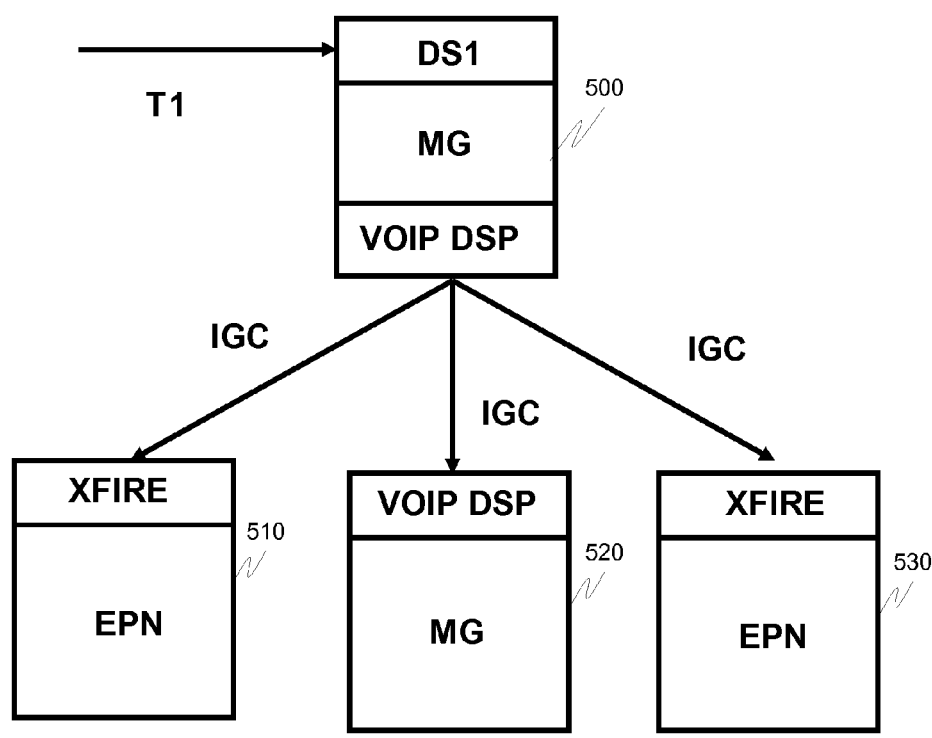
FIG. 5 illustrates sync distribution to an IP media gateway according to this invention.

FIG. 5 illustrates an exemplary embodiment for timing sync distribution for an IP media gateway. Specifically, media gateway 500 is the master source since it is a member with a DS1/BRI clock/sync reference originating from the T1. The media gateway 500 is the master for all the illustrated domains since it supplies clocking to all members, specifically the EPN 510, media gateway 520 and EPN 530, via the IGCs illustrated.

Figure 6:
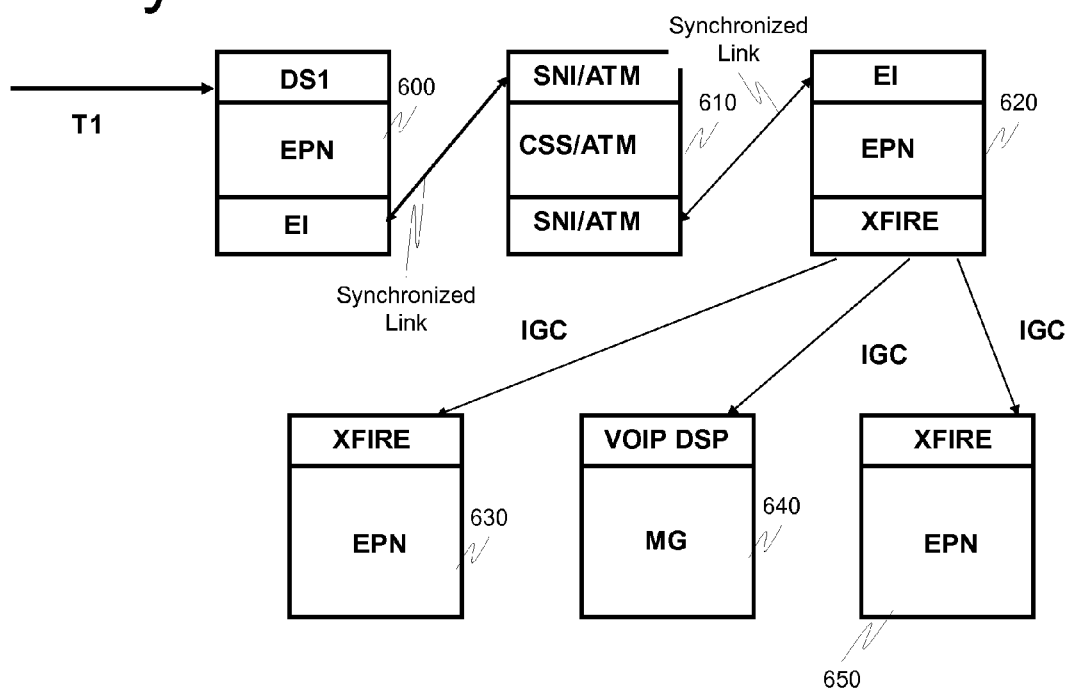
FIG. 6 illustrates sync distribution to a CSS/ATM according to this invention.

FIG. 6 illustrates another exemplary embodiment for timing sync distribution in a CSS/ATM environment. In particular, in this particular exemplary embodiment, synchronized links are present between the EPN 600, CSS/ATM 16, and EPN 620. The EPN 620 is the master source for members 630, 640 and 650 in that it derives its timing information via the synchronized links from EPN 600.

Figure 7:
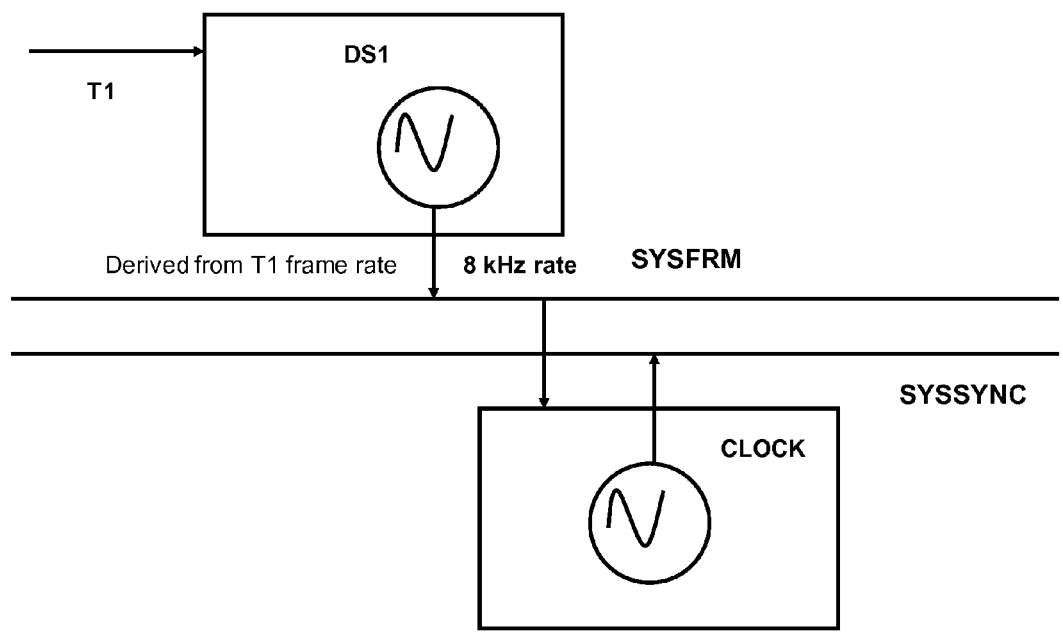
FIG. 7 illustrates clock reference derivation from a PSTN T1 according to this invention.

FIG. 7 illustrates the interaction of a primary timing source, in this case, a DS1, with the local clock in a port network or media gateway. The DS1 span is defined as the link between the PSTN and DS1 board. This data on this link is usually sent at a 1.54 Mps rate. The DS1 board extracts an 8 Kilohertz reference rate and sources a SYSFRM signal. The local clock synchronizes it oscillator with that signal and conducts various checks to determine the validity of the signal. The signal must not appreciably vary from the frequency of the oscillator. If it is a good signal (within 5 ppm), the clock sources the SYSSYNC signal which is used to time all the other circuit packs in the cabinet. If it is not, the local oscillator is used to source SYSSYNC.

Figure 8:
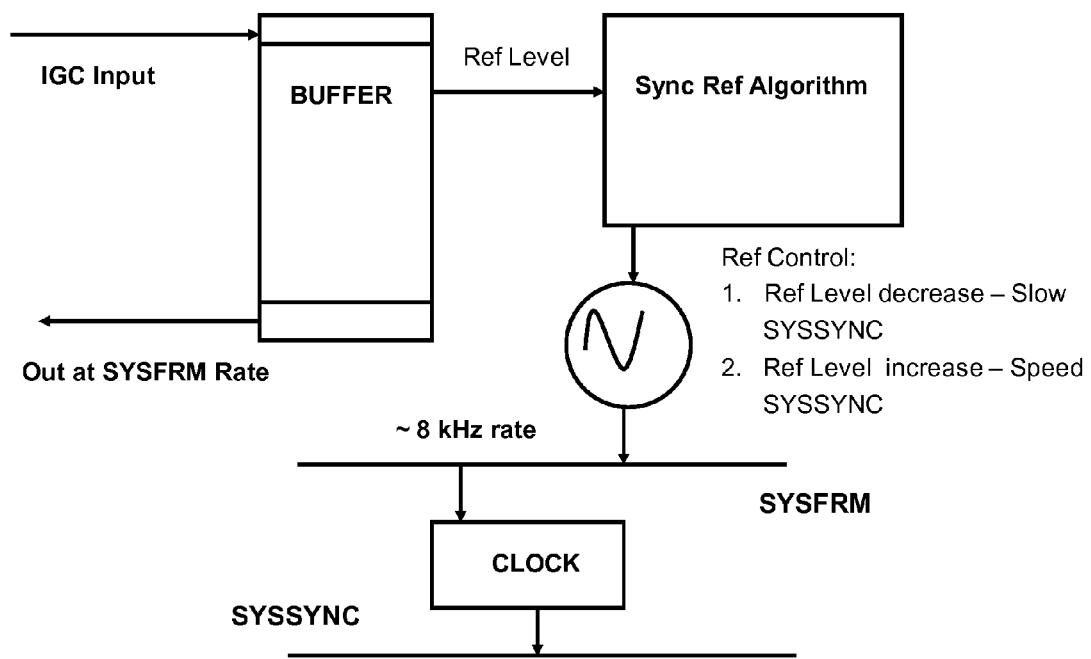
FIG. 8 illustrates clock reference determination for an IGC IP stream according to this invention.

FIG. 8 illustrates the interaction between the incoming IGC and the local clock. Essentially, the DS1 is FIG. 7 has been replaced by a firmware module which monitors the buffer level and utilizes the algorithm earlier discussed to determine a framing signal. The local clock acts as described in FIG. 7 and the SYSSYNC is sourced.

Figure 9:
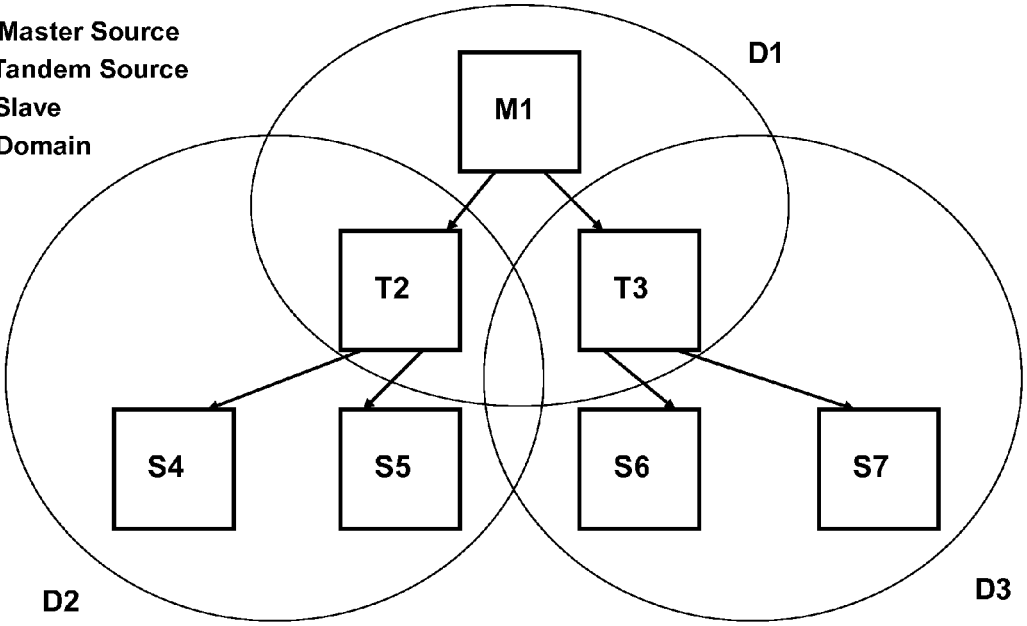
FIG. 9 illustrates another example of IP sync distribution according to this invention.

FIG. 9 illustrates another exemplary embodiment of IP sync distribution in an environment with three domains, D1, D2 and D3. The master source M1 provides timing information to tandem clock sources T2 and T3. Tandem clock sources T2 and T3 provide timing information to slaves S4 and S5, and S6 and S7 respectively. Domain D1 is the master domain since it has the member (M1) having a DS1/BRI clock/sync reference emanating IGC streams to other members in other domains.

Figure 10:
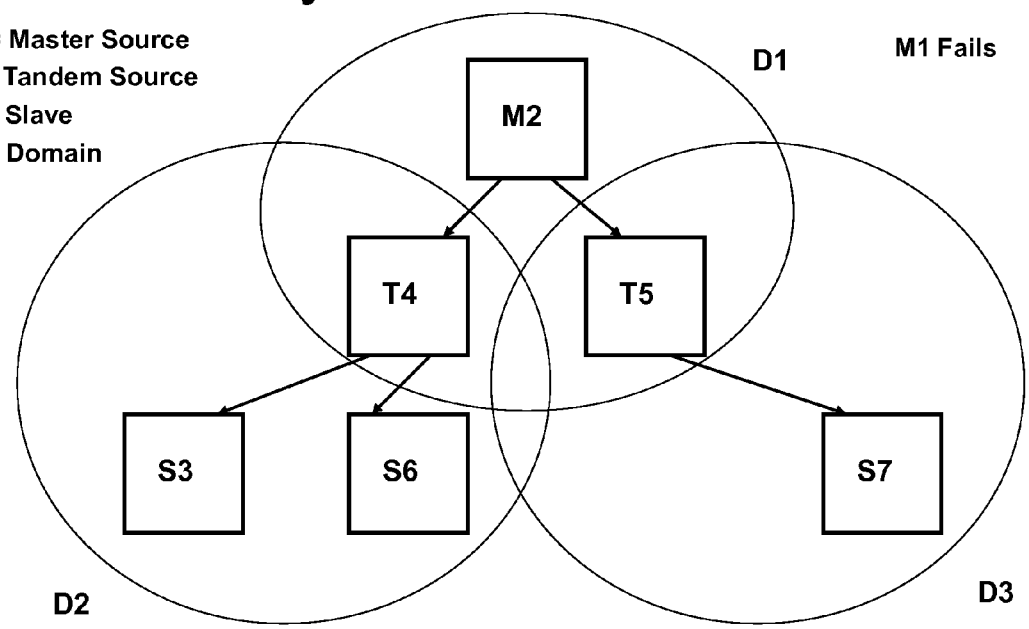
FIG. 10 illustrates a further example of IP sync redistribution according to this invention.

FIG. 10 illustrates an exemplary embodiment of domain reconfiguration in the event that a master clock source (M1) fails. In this exemplary embodiment, tandem clock source (not shown) has been promoted to master clock source M2. In addition, slave 4 was promoted to tandem clock source T4 and slave 5 to tandem clock source T5. Tandem clock source T3 was demoted to slave 3, slave 6 remains as slave 6, however moves from domain 3 to domain D2 and slave S7 receives its timing information via an IGC connection from tandem clock source T5.

In FIG. 10, the configuration in FIG. 9 has been reassigned, assuming that the master clock source M1 has failed.

Figure 11:
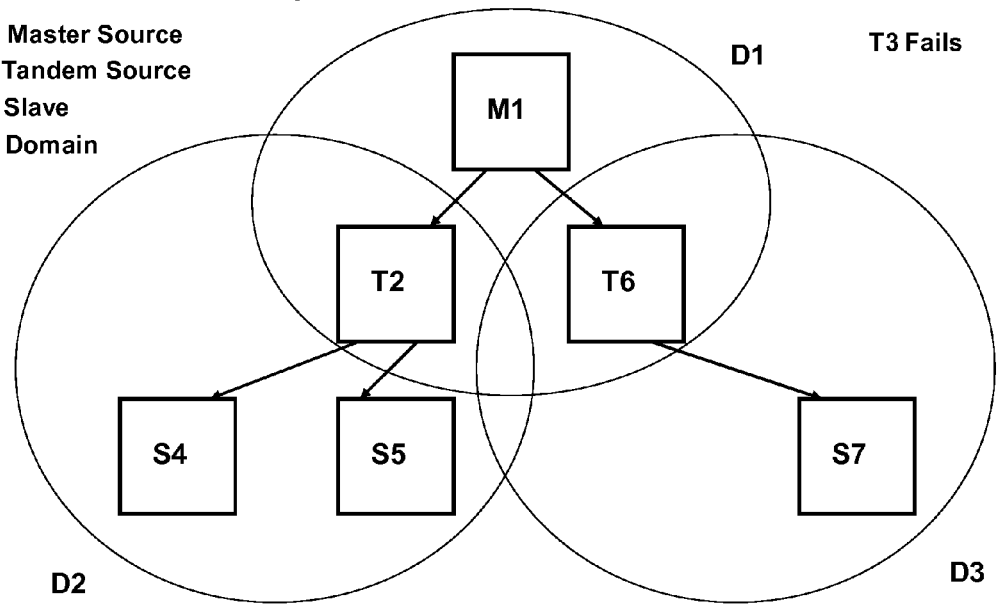
FIG. 11 illustrates yet another example of IP sync redistribution according to this invention.

In FIG. 11, another exemplary embodiment of IP sync redistribution is shown again based on FIG. 9. This time, the scenario being that tandem clock source T3 fails. In this example, slave 6 is promoted to tandem clock source T6 but the remaining architecture remains the same. Thus, in the master domain (D1), members M1, T2 and T6 are present. In domain D2, members T2, S4 and S5 are present. In domain (D3) members T6 and S7 are present.

Figure 12:
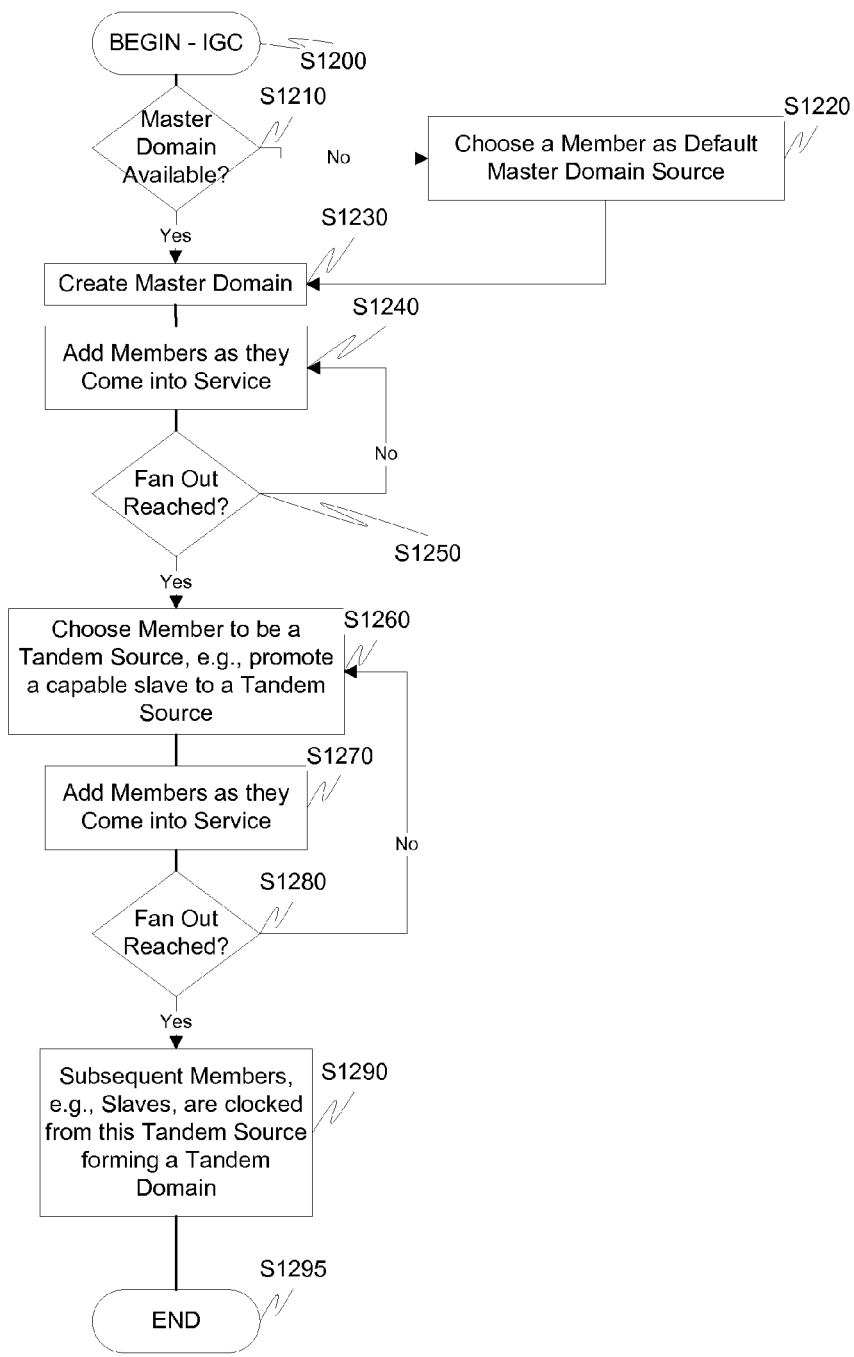
FIG. 12 illustrates an exemplary method for domain management according to this invention.

FIG. 12 illustrates an exemplary method of timing sync distribution when a first member (IGC source) comes into service. More particularly, control begins in step S1200 and continues to step S1210.

In step S1210, a determination is made whether a master domain is available. If a master domain is not available, control continues to step S1220 where a member is chosen as the default master domain source. Control then continues to step S1230.

If a master domain is not available, control jumps to step S1230. In step S1230, a master domain is created. Next, in step S1240, members are added to the master domain as they come into service. Then, in step S1250, a determination is made whether fan-out has been reached. If fan-out has not been reached, control jumps back to step S1240 with control otherwise continuing to step S1260.

In step S1260, a member is chosen to be a tandem clock source. For example, any member, such as a capable slave, can be promoted to a tandem clock source. Next, in step S1270, members are added as they come into service. Then, in step S1280, a determination is made whether fan-out has been reached. If fan-out has not been reached, control jumps back to step S1260 for the addition of members. Otherwise, control jumps to step S1290 where subsequent members, such as slaves, are clocked from this tandem source forming a tandem domain. Control then continues to step S1295 where the control sequence ends.

Figure 13:
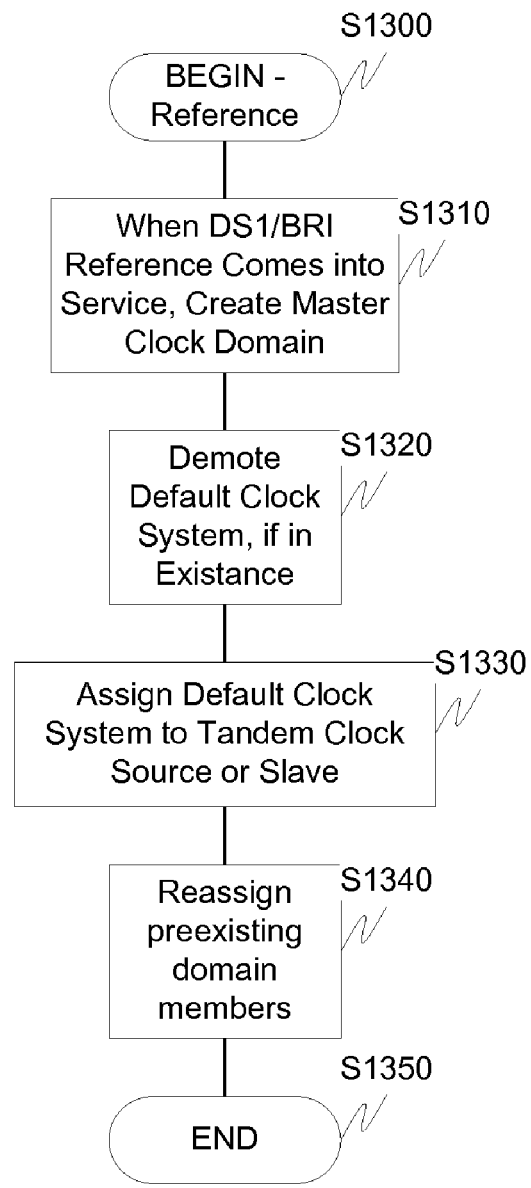
FIG. 13 illustrates an exemplary method for establishing a master source according to this invention.

FIG. 13 outlines an exemplary method of sync distribution when a member with a DS1/BRI reference comes into service. More specifically, control begins at step S1300 and continues to step S1310. In step S1310, when the DS1/BRI reference comes into service, a master domain clock is created. Next, in step S1320, a default clock system, if present, is demoted. Then, in step S1330, the default clock system can optionally be assigned to be a tandem clock source or slave. Control then continues to step S1340.

In step S1340, preexisting domain members can optionally be reassigned, if needed. Control then continues to step S1350 where the control sequence ends.

Figure 14:
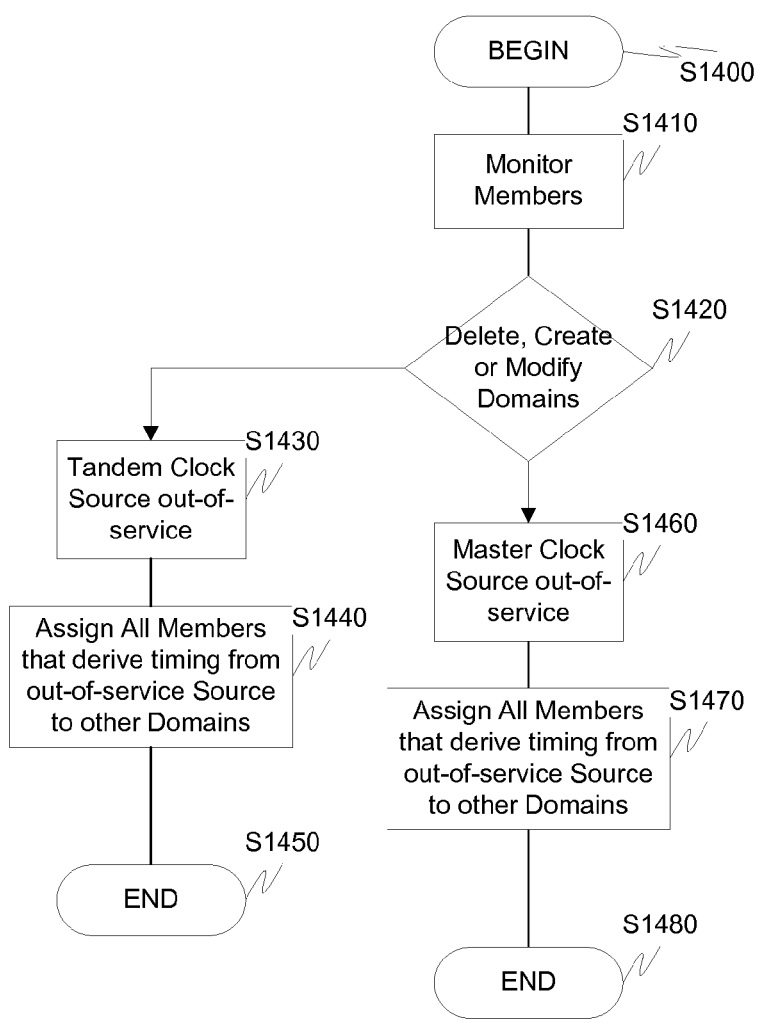
FIG. 14 illustrates an exemplary method of member reassignment according to this invention.

FIG. 14 outlines an exemplary method of domain management according to this invention. In particular, more specifically, control begins in step S1400 and continues to step S1410. In step S1410, one or more of the members in one or more domains are monitored. Next, in step S1420, a determination is made whether to delete, create or modify domains. For example, if a tandem clock source has gone out of service in step S1430, all members that derive timing from the out of service source are assigned to other domains in step S1440 with control continuing to step S1450.

If, however, a master clock source has gone out of service in step S1460, in step S1470 all members that derive timing from the out of source service are assigned to other domains. Control then continues to step S1480 where the control sequence ends.

As another alternative, if no DS1/BRI reference source is available, a member's own internal signal can be used as the master source. When the DS1/BRI reference comes back into service, timing can be resynchronized to that clock signal.

The IP clock synchronization determination can be performed by any member in any domain. Clearly, any member that is forwarding synchronization information to another member should have the capability of determining the IP clock synchronization information. Therefore, each member can have a module that performs this functionality with an exemplary embodiment of this module being implemented in firmware. In general, the determination focuses around the calculation of the differences between the arrival times of receive packets and the outpulsing of the signal to an FPGA, in a window. For example, and in accordance with an exemplary non-limiting embodiment, the outpulsing of the 10 mS signal to the FPGA is used. The module programs the initial value of the interrupt timer using the 10 mS arrival time, and enables the interrupt. The module determines the time it takes to generate (window size) samples and compares it to the time it takes to receive (window size) samples. The difference (delta) is accumulated. The accumulation value is used to adjust the interrupt timer. The goal is to make accumulated value close to zero.

For example, the module can use a DSP free running timer (sometimes referred to as a local clock) as a baseline clock for the clock sync implementation. Different DSP platforms use different input clocks. To assist with making the code platform independent, the module can pre-calculate the number of clock cycles in a 10 mS (TDM bus millisecond), in a first calculation, and use it to calibrate the rest of the measurement, when needed. To access the free-running clock, the module can be called a get cycle count ( ) routine that can return, for example, 32-bit results. An incoming packet is time-stamped by the local clock. Another process can call a clock synchronization procedure to process the IGC call. The clock synchronization procedure can determine the timer for the interrupt and store that as a timer value. The interrupt timer can load the timer value to the timer compare register after it generates the window size samples.

During initialization, the module waits for window-depth times window size samples before it determines the first window interval (cycles per window). The module takes the average of the window, collected every window size for the window depth times, divides it by the sample size to obtain 10 mS timer. A large sample size gives better clock accuracy, which helps speed up the convergences. The module programs the interrupt timer with the valued obtains, and enables the interrupt.

Next, the module determines the next receive period (cycles per window) and compares it to the output period (cycles per IMT). The difference is accumulated in an accumulated value. The positive accumulated value delta indicates that the outgoing rate is faster than the incoming rate. The module needs to increase the timer for the interrupt. A negative accumulated value delta indicates the output rate is slower than the input rate. The module therefore needs to lower the timer for the interrupt.

The module can also scale the accumulated value delta. The pre-scale result can be used to determine the timer adjustment. The adjustment is done conservatively to avoid introducing abrupt changes to the output pulses as well as causing the frequency to overshoot the center frequency (i.e., off frequency). The pre-scale accumulated value delta is used to prevent the module from reacting too quickly to momentary jitter.

Another exemplary version of the recovery process is to minimize perturbing sync to members which have not lost IGC connectivity with their source. When the IGC to a destination (member) is lost, a new IGC can be established from a source (member) which has viable connectivity to the faulted destination (member). Only one IGC is moved (or re-established). Since the clock in the faulted member has some hysteresis (holdover) capability, the IGC streams originating from the faulted member and sync of members which are slaves to the faulted member will have minimum if any disturbance.

A number of variations and modifications of the invention can be used. It would be possible to provide or claims for some features of the invention without providing or claiming others.

The exemplary systems and methods of this invention have been described in relation to network timing. However, to avoid unnecessarily obscuring the present invention, the description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show various components of the system collocated, certain components of the system can be located remotely, at distant portions of a distributed network, such as a LAN, cable network, and/or the Internet, or within a dedicated system. Thus, it should be appreciated, that the components of the system can be combined in to one or more devices, such as a gateway, or collocated on a particular node of a distributed network, such as an analog and/or digital communications network, a packet-switch network, a circuit-switched network or a cable network.

It will be appreciated from the preceding description, and for reasons of computational efficiency, that the components of the system can be arranged at any location within a distributed network of components without affecting the operation of the system. For example, the various components can be located in a switch such as a PBX and media server, gateway, a cable provider, enterprise system, in one or more communications devices, at one or more users' premises, or some combination thereof. Similarly, one or more functional portions of the system could be distributed between a communications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

In yet another embodiment, the systems and methods of this invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention.

Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a computer-readable storage medium, executed on programmed general-purpose computer with the cooperation of a controller and memory, a special purpose computer, a microprocessor, or the like. In these instances, the systems and methods of this invention can be implemented as a program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The invention claimed is:

1. A method for determining clock synchronization in an IP connected network having a plurality of members in one or more domains comprising:

determining a difference between an arrival time of a received packet and outpulsing of a signal to a digital signal processor, in a window;

determining a time to generate a number of samples and a time to receive the number of samples, wherein the number is a window size of the window;

accumulating a delta which is used to adjust an interrupt timer and synchronize the clock in at least one member; and sending clock synchronization information over one or more inter-gateway connections (IGC) within the IP connected network to a tandem source, wherein:

the tandem source is a member within a domain with an IGC derived clock or sync reference;

a slave member has an IGC derived clock or sync reference;

a tandem domain has members having an IGC derived clock or sync reference emanating IGC streams to other members; and a master domain has members having a DS1 or BRI or clock sync reference emanating IGC streams to other members.

2. The method of claim 1, wherein the adjusting of the interrupt timer continues to drive the accumulated delta to zero.

3. The method of claim 1, further comprising when a positive accumulated value delta indicates that an outgoing rate is faster than an incoming rate, increasing the timer for the interrupt.

4. The method of claim 1, further comprising when a negative accumulated value delta indicates that an outgoing rate is slower than an incoming rate, decreasing the timer for the interrupt.

5. The method of claim 1, wherein the accumulated value delta is scaled.

6. The method of claim 1, wherein a pre-scaled accumulated value delta is used to prevent momentary reactions to jitter.

7. A means for performing the determining steps and a means for performing the accumulating step of claim 1.

8. A non-transitory computer-readable storage media having instructions stored thereon that when executed by a processor perform the steps of claim 1.

9. A system for clock synchronization in an IP connected network having a plurality of members in one or more domains comprising:

a controller that:

determines a difference between an arrival time of a received packet and outpulsing of a signal to a digital signal processor, in a window;

determines a time to generate a number of samples and a time to receive the number of samples, wherein the number is a window size of the window;

accumulates a delta which is stored and used to adjust an interrupt timer and synchronize the clock in at least one member; and sends clock synchronization information over one or more inter-gateway connections (IGC) within the IP connected network to a tandem source, wherein:

the tandem source is a member within a domain with an IGC derived clock or sync reference;

a slave member has an IGC derived clock or sync reference;

a tandem domain has members having an IGC derived clock or sync reference emanating IGC streams to other members; and a master domain has members having a DS1 or BRI or clock sync reference emanating IGC streams to other members.

10. The system of claim 9, wherein the adjusting of the interrupt timer continues to drive the accumulated delta to zero.

11. The system of claim 9, further comprising when a positive accumulated value delta indicates that an outgoing rate is faster than an incoming rate, the controller increases the timer for the interrupt.

12. The system of claim 9, further comprising when a negative accumulated value delta indicates that an outgoing rate is slower than an incoming rate, the controller decreases the timer for the interrupt.

13. The system of claim 9, wherein the accumulated value delta is scaled.

14. The system of claim 9, wherein a pre-scaled accumulated value delta is used to prevent momentary reactions to jitter.

* * * * *

UNITED STATES PATENT AND TRADEMARK OFFICE
CERTIFICATE OF CORRECTION

PATENT NO. : 8,401,007 B2
APPLICATION NO. : 12/419144
DATED : March 19, 2013
INVENTOR(S) : Vipapun Thavisri It is certified that error appears in the above-identified patent and that said Letters Patent is hereby corrected as shown below:

In the Claims:

Column 13, line 34, delete "value".

Column 14, line 38, delete "value".

Signed and Sealed this
Eleventh Day of June, 2013

Teresa Stanek Rea
*Acting Director of the United States Patent and Trademark Office*